Feb. 4, 1930.    R. LEWELLING    1,745,628
ELECTRICAL CONDENSER
Filed Sept. 24, 1926
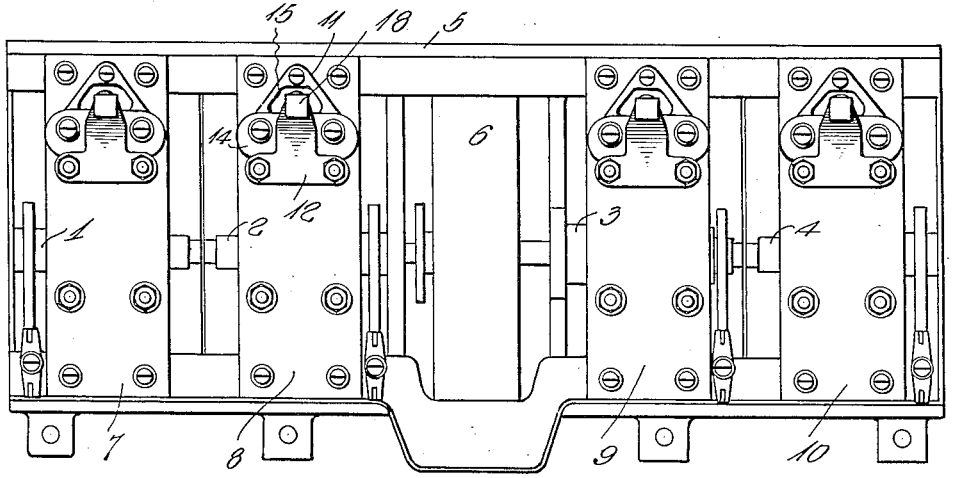
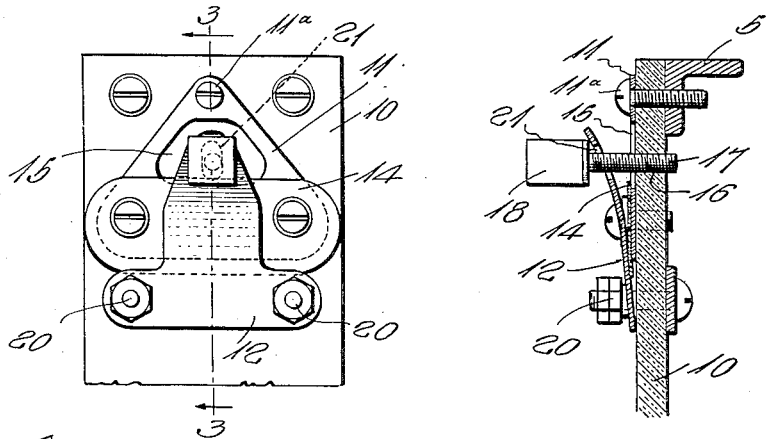
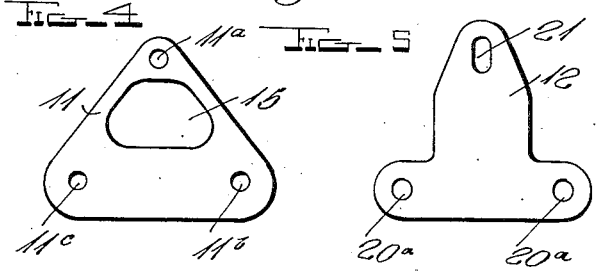
INVENTOR.
Raymond Lewelling
BY
John B. Brady
ATTORNEY.

Patented Feb. 4, 1930

1,745,628

UNITED STATES PATENT OFFICE

RAYMOND LEWELLING, OF ST. HELENA, CALIFORNIA, ASSIGNOR TO FEDERAL TELEGRAPH COMPANY, OF SAN FRANCISCO, CALIFORNIA, A CORPORATION OF CALIFORNIA

ELECTRICAL CONDENSER

Application filed September 24, 1926. Serial No. 137,570.

My invention relates broadly to electrical condensers and more particularly to a construction of compensating condenser for use with variable condenser constructions.

One of the objects of my invention is to provide a construction of variable condenser of small physical dimensions which may be readily mounted adjacent the rotor and stator elements of a multiple condenser system and connected in shunt with the rotor and stator elements thereof whereby a constant ratio for each condenser of the multiple condenser system may be secured.

Another object of my invention is to provide a construction of variable condenser for operation with the rotor and stator elements of a multiple variable condenser where the ratio of maximum to minimum capacity may be accurately fixed for each condenser in the system.

Still another object of my invention is to provide a construction of compensating condenser for association with variable condenser systems in which a resilient plate member is arranged to be adjusted with respect to a stationary plate member by a rolling motion of the adjustable plate under the action of a micrometer screw for fixing the ratio of maximum to minimum capacity for each of the condensers in the multiple system.

My invention will be more clearly understood from the specification hereinafter following by reference to the accompanying drawings, in which:

Figure 1 illustrates a multiple condenser construction employing the principles of my invention; Fig. 2 is a fragmentary view of one of the adjustable compensating condensers mounted upon a panel adjacent the multiple condenser system; Fig. 3 is a cross-sectional view of the compensating condenser of my invention; and Figs. 4 and 5 are plan views of the stationary and variably movable plates of the condenser construction of my invention.

In radio receiving apparatus where a multiple number of tuning condensers are employed for adjusting a plurality of circuits therein to resonance for a particular frequency, it is necessary that the ratio of maximum to minimum capacity of each variable condenser system be the same. The ratio of maximum to minimum capacity for variable condensers used in circuits adjusted for operation over a wavelength range of 200 to 550 meters is 7.56, while the wavelength ratio is 2.75 following the expression:

$$\frac{C_{v180} + C_f}{C_{vo} + C_f} = \rho$$

Wherein
- $C_{v180}$ = capacity at maximum exposure of stator and rotor plates;
- $C_{vo}$ = capacity at minimum exposure of rotor and stator plates;
- $C_f$ = capacity of compensating condenser and subsequent capacities.

Inasmuch as the shape of the stator and rotor plates of a condenser system are not uniform in one condenser with respect to another condenser, even though it may have practically the same physical dimensions, the capacity ratio for several condensers varies to a substantial degree. I have devised the construction of condenser herein for compensating and correcting for this difference in capacity ratio so that each condenser of a plurality of condensers may have the capacity ratio thereof matched for the accurate control of the several circuits for the receiving system in which the condensers are employed.

I mount the compensating condensers directly upon the terminal boards for each of the variable condenser systems. These compensating condensers are parallel connected with the stator and rotor plates of the variable condenser, and by means of a micrometer screw adjustment the capacity ratio may be initially fixed and thereafter accurately maintained.

Referring to the drawings in more detail, reference characters 1, 2, 3 and 4 represent control shafts for the rotor elements of a plurality of variable condensers which have their stator elements mounted in a frame 5 for cooperating therewith. The rotor elements are movable by means of a control 6 which may be actuated by a suitable means from the front of a panel of a radio receiver, as described more particularly in copending applications Ser. No. 753,653 filed December 3, 1924, and Ser. No. 98,308 filed March 29, 1926 by William M. Brower.

Each of the variable condenser units is provided with a terminal board or panel represented at 7, 8, 9 and 10 on which the compensating condensers are mounted. The compensating condensers consist of a pair of metallic plates 11 and 12 separated by a sheet of mica insulation represented at 14. The plate 11 is mounted directly upon the panel adjacent the rotor and stator plates of the variable condenser and is secured upon the panel at points 11$^a$, 11$^b$ and 11$^c$. The triangular plate 11 is provided with a polygonal aperture 15 which registers with a screw threaded bore 16 in the insulated panel. The screw threaded bore 16 is arranged to receive the adjusting screw 17 having a rectangular head 18 facilitating the gripping thereof for rotation whereby the resilient plate 12 may be advanced toward the stationary plate 11, or the resilient plate 12 may be rolled away from the plate 11 by retracting the screw 17. This motion is effected by reason of the construction of the resilient plate 12 which is substantially T-shaped and secured at points 20 to the panel by retaining screws which pass through apertures 20$^a$ in T-shaped resilient sheet member 12. The extremity of the resilient plate member 12 is provided with an elongated aperture 21 through which the screw device 17 passes, allowing movement of the resilient plate 12 with respect to the stationary plate 11. The screw device which passes through the aperture 11$^a$ into stationary plate 11 is secured to the frame 12 which is in turn grounded to the stator plates of the variable condenser. The members 20 electrically connect with the rotor plates of the variable condenser and in this manner the compensating condenser is connected in shunt with the variable condenser. The sheet of insulation 14 is secured by means of screw members which pass through apertures 11$^c$ and 11$^b$ in triangular shaped stationary plate 11 and into the panel.

The compensating condensers may be individually adjusted for fixing the capacity ratio for each condenser of the multiple number of condensers. A small wrench is slipped over the head 18 at each of the screws 17 for advancing or retracting the screw for obtaining the desired spacial relation between the plates 11 and 12.

While I have described my invention in certain particular embodiments I desire that it be understood that modifications may be made and that no limitations are intended upon the invention other than are imposed by the scope of the appended claims.

What I claim as new and desire to secure by Letters Patent of the United States is as follows:

1. A compensating condenser for a variable condenser comprising an insulated frame structure, a flat plate member carried by said frame structure, said plate member being apertured adjacent two edges thereof, remote from another edge thereof, a resilient plate member of substantially T-shaped contour mounted on said insulated frame structure in a position adjacent said first mentioned plate, a screw device passing through said last mentioned plate and the apertured portion of said first mentioned plate, and an insulating sheet interposed between said plates whereby said second mentioned plate may be varied in position with respect to said first mentioned plate and the capacity ratio of said condenser thereby adjusted.

2. A compensating condenser for variable electrical condensers comprising in combination with an insulated panel, a flat triangular shaped plate member apertured in a position adjacent the apex thereof and having a relatively wide band portion adjacent the base thereof, a resilient T-shaped plate mounted on said panel adjacent the base of said triangular shaped plate and substantially insulated from said triangular shaped plate, and a screw device passing through the extremity of said resilient plate and through the apertured portion of said first mentioned plate in a position substantially insulated from said first mentioned plate, and adjustably threaded into said panel whereby the spacial relation of said plates may be adjusted for changing the capacity of said condenser.

3. A compensating condenser for variable electrical condensers comprising in combination with an insulated supporting panel a triangular shaped plate apertured adjacent the apex thereof with a relatively wide band portion adjacent the base thereof, a T-shaped plate of resilient material with one extremity thereof secured to said panel and the other extremity thereof projecting over the band portion of said triangular shaped plate and terminating in a position over the apertured portion of said triangular shaped plate, and a micrometer screw device passing through the extremity of said last mentioned plate and the apertured portion of said first mentioned plate and engaging said panel for changing the spacial relation of said plates and adjusting the capacity ratio of said variable condenser.

4. A compensating condenser for shunt connection with the rotor and stator plates of a variable condenser comprising a flat triangular shaped plate member having a substantially trapezoidal aperture adjacent two edges thereof and remote from the other edge, an insulation sheet overlying said flat plate member, a resilient plate member, means for securing one end of said resilient plate member in fixed position adjacent said first mentioned plate member but insulated therefrom in a plane extending over a portion of the triangularly shaped plate and terminating above the trapezoidal aperture, and a micrometer screw operatively engaging the other end of said resilient plate member and passing through said flat plate member but insulated therefrom for rolling said resilient plate member with respect to said first mentioned plate member for varying the spacial relation of said plate members and correspondingly varying the electrical capacity of said condenser.

In testimony whereof I affix my signature.

RAYMOND LEWELLING.